United States Patent [19]

Hunkeler

[11] Patent Number: 4,759,113
[45] Date of Patent: Jul. 26, 1988

[54] HOB CLAMPING SYSTEM

[75] Inventor: Ernst J. Hunkeler, Fairport, N.Y.

[73] Assignee: The Gleason Works, Rochester, N.Y.

[21] Appl. No.: 61,253

[22] Filed: Jun. 10, 1987

[51] Int. Cl.[4] .................... B23Q 3/155; B23F 23/12
[52] U.S. Cl. ........................... 29/568; 409/11; 409/233; 409/236
[58] Field of Search ............... 29/568; 409/11, 12, 409/231–234, 236; 407/23

[56] References Cited

U.S. PATENT DOCUMENTS

| 4,015,510 | 4/1977 | Hodgson | 409/236 |
| 4,137,822 | 2/1979 | Behnke | 409/232 |
| 4,287,659 | 9/1981 | Erhardt et al. | 409/11 X |
| 4,536,110 | 8/1985 | Farrell et al. | 409/11 |
| 4,590,661 | 5/1986 | Lunazzi | 29/568 |

FOREIGN PATENT DOCUMENTS 124517 7/1984 Japan ..................... 409/233
146622 8/1985 Japan ..................... 409/11

Primary Examiner—Gil Weidenfeld
Assistant Examiner—Steven C. Bishop
Attorney, Agent, or Firm—Thomas B. Ryan; Eugene S. Stephens; Morton A. Polster

[57] ABSTRACT

A tensioner having screw threads tightened by rotation of a hob drive (15) is used for applying clamping pressure to a hob (10) in a working position in a hobbing machine. The tensioner extends through the hob between the end supports (11 and 12) of the hobbing machine and has threads arranged so that a wrench system can hold part of the tensioner against rotation while the hob drive tightens the threads to a predetermined clamping torque. The tensioner can be a single draw rod (20) extending from driving end support (11), through hob (10), and into threaded engagement with idler end support (12); and the tensioner can include a hob mounting arbor (45) having threaded ends into which a pair of opposed tensioner rods (20 and 46) are threaded.

31 Claims, 3 Drawing Sheets

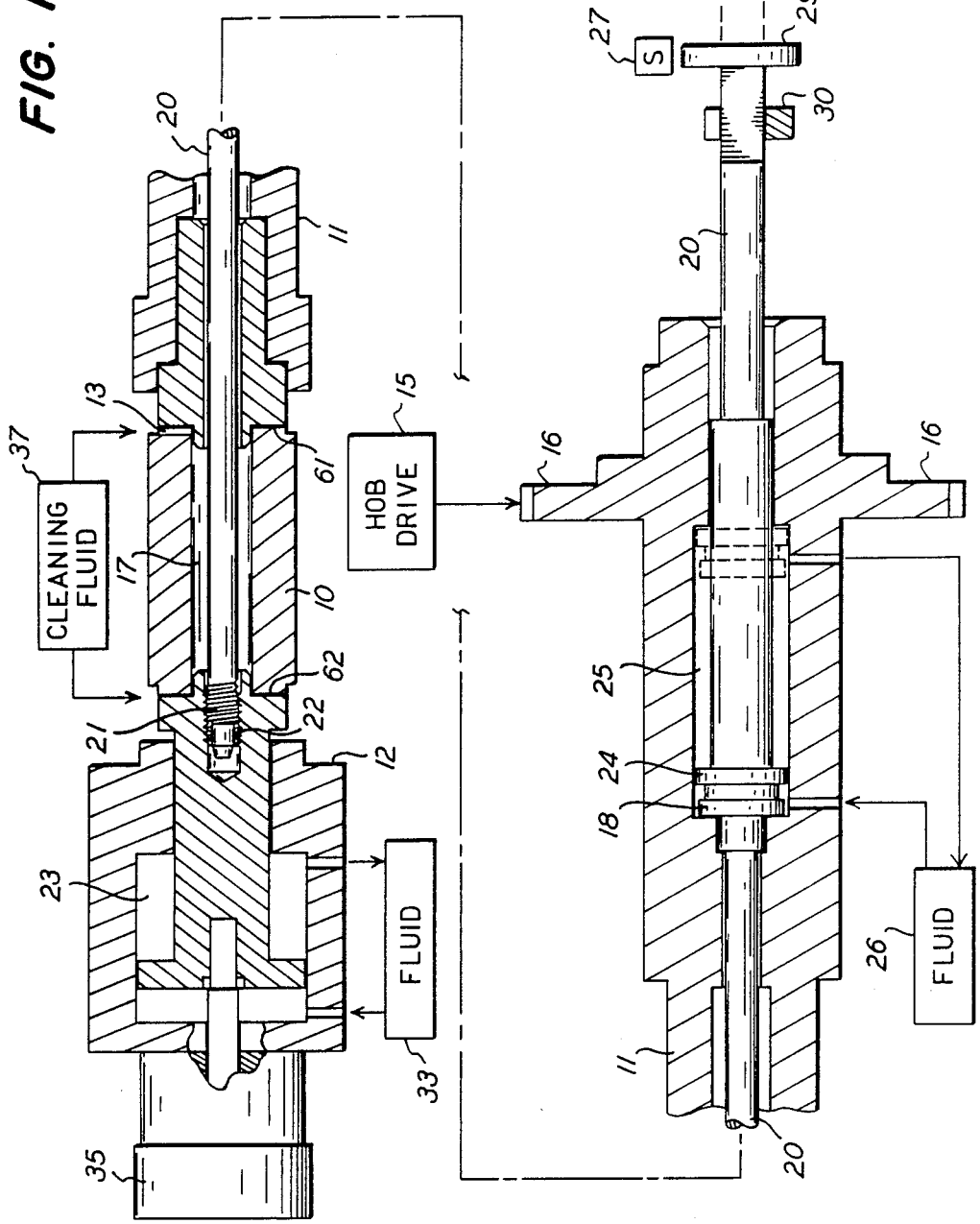

HOB CLAMPING SYSTEM

BACKGROUND

Hob clamping in hobbing machines has been manual, requiring tightening of a nut with a torque wrench, or automatic, involving spring-loaded clamping systems to apply clamping pressure. Manual clamping is subject to operator error, and spring-loaded clamping systems provide inadequate hob clamping pressure and are complex and expensive. Thus, neither manual nor automatic hob clamping has yet been satisfactory.

I have devised a simpler and more effective way of automatically clamping a hob in place with a predetermined and optimum compression force. My hob clamping system uses the hob drive, with its large and variable capacity torque, for applying the clamping pressure to the hob; and this is done automatically, without operator intervention, to ensure that each hob is clamped reliably in place. My hob clamping system also achieves this with only a small additional cost for a hobbing machine.

SUMMARY OF THE INVENTION

I use a tensioner with threads that can be tightened by the hob drive for compressively clamping a hob between the end supports of a hobbing machine. The tensioner can move axially of the hob and can be extended through the hob between the hob end supports, which the tensioner can pull compressively against the hob ends. Part of the tensioner is held against rotation while the hob drive, with its powerful and variable speed motor, rotates the end supports and the hob to tighten the tensioner threads to a predetermined torque. In one version, the tensioner includes a draw rod mounted in one of the end supports and having threads that are threadable into the opposite end support. In another version, the tensioner includes a hob arbor with threaded ends into which a pair of tension rods are respectively threadable. In either case, a wrench system engages and holds the rod portion of the tensioner against rotation while the hob drive applies the thread tightening torque.

DRAWINGS

The drawings schematically illustrate my hob clamping system to eliminate details of the hobbing machine and to focus on the essential elements of my system.

FIG. 1A is an enlarged, vertical cross-sectional view of the embodiment of FIG. 1.

DETAILED DESCRIPTION

Figure 1:
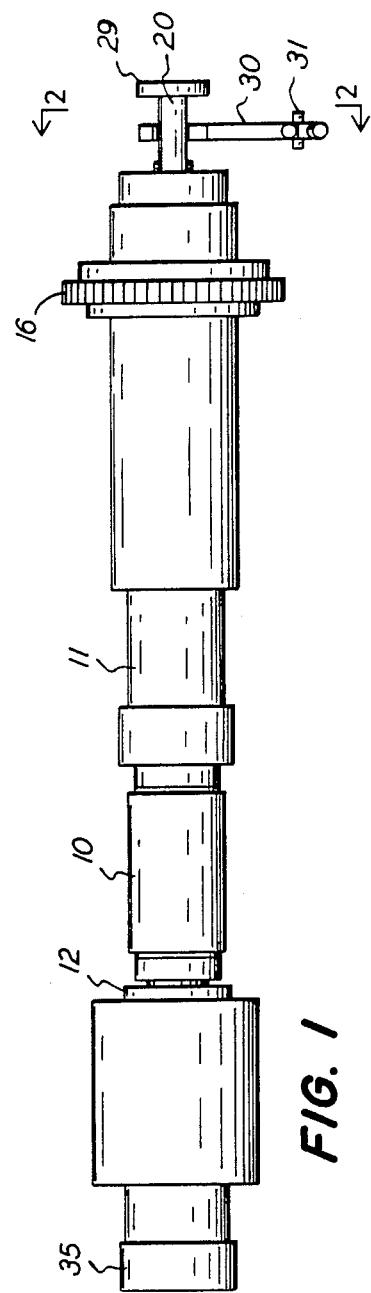
FIG. 1 is a partially schematic, plan view of one preferred embodiment of my clamping system for an arborless hob.

My clamping system involves a reliable way of compressively clamping a hob between the end supports of a hobbing machine so that the hob is rigidly mounted to rotate without deviating from its working position. To accomplish this I use a tensioner that, in FIGS. 1, 1A, and 2, comprises draw rod 20 extending through the central bore 17 of an arborless hob 10. Draw rod 20 has a head 18 mounted in one of the end supports and a threaded end 21 threadable into the other end support, and I prefer that head 18 be mounted in driving end support 11 and that threaded end 21 screw into threads 22 in idler end support 12. Key 13 can key the driven end face of hob 10 to the mating radial face 61 of end support 11 to ensure that hob 10 rotates with its driven end support. A frictional engagement between hob 10 and end support 12 is normally adequate. Driven end support 11 is rotated by hob drive 15, which is a powerful and variable speed motor capable of applying a large torque that can be varied by regulating current to the motor. The variable torque from hob drive 15 is applied to gear 16, which turns driving end support 11. This also turns hob 10 and idling end support 12, whenever hob 10 is keyed or pressed between its end supports.

To get hob 10 into and out of its working position, draw rod 20 is movable axially, preferably by means of cylinder 25 that can be powered by hydraulic or pneumatic fluid 26. A piston head 24 on draw rod 20 moves in cylinder 25 between the solid line position, where draw rod 20 extends through hob 10 between the end supports, and the broken line position, where draw rod 20 is retracted clear of the working position of hob 10. Sensors 27 and 28 are positioned to detect the extended and retracted positions of draw rod 20 at its end cap 29.

Idler end support 12 is also movable axially of hob 10, preferably by means of cylinder 23 powered by hydraulic or pneumatic fluid 33. A motor 35, which is preferably hydraulic, can rotate idler end support 12 for two purposes. One is to rotate the radial clamping face 62 of idler end support 12 when hob 10 is absent so that a spray of cleaning fluid 37 can clean away any chips or fragments. Cleaning fluid 37 is also directed against the radial clamping face 61 of driving end support 11, which can be rotated by hob drive 15 during cleaning. The other purpose of motor 35 is to quickly turn end support threads 22 onto or off of draw rod threads 21. Although this occurs at a small torque far short of the necessary clamping torque, it can be done more rapidly by motor 35 than by the slower turning hob drive 15.

Figure 2:
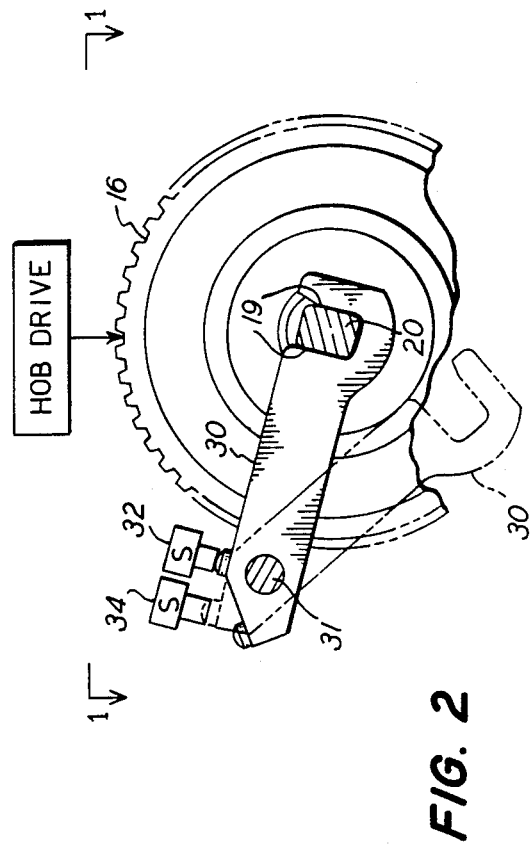
FIG. 2 is an enlarged, cross-sectional view of the clamping system of FIG. 1, taken along the line 2—2 thereof.

To hold rod 20 against rotation, a wrench 30, movably mounted on the hobbing machine, can grip flat regions 19 of draw rod 20 near end cap 29 where draw rod 20 extends clear of driving end 11. Wrench 30, as best shown in FIG. 2, turns about a pivot 31 between the solid and broken line positions that are respectively detected by sensors 32 and 34. As the tensioner threads are tightened, the head 18 of draw rod 20 is drawn against an inside surface of end support 11, urging its radial clamping face 61 against one end of hob 10, while the tightening threads pull the radial clamping face 62 of idler end support 12 against another end of hob 10, compressively clamping hob 10 between its end supports.

A hob clamping sequence begins after withdrawal of a predecessor hob from between end supports 11 and 12 that are axially separated by the hobbing machine, with draw rod 20 retracted to its broken line position clear of the working position of hob 10. The radial clamping faces 61 and 62 of end supports 11 and 12 are also rotating and being sprayed with cleaning fluid 37. Then a sharp hob is moved by a carrier (not shown) into the working position between end supports 11 and 12.

Draw rod 20 is then advanced by cylinder 25 to extend through hob 10 between end supports 11 and 12 to its solid line engaged position where it is held against rotation by wrench 30. Motor 35 is rotating idler end support 12 so that when draw rod threads 21 engage end support threads 22, motor 35 quickly spins these threads together at a light torque. As this occurs, key 13 drops into its key way, leaving hob 10 lightly gripped between end supports 11 and 12 and draw rod 20 lightly threaded into idler end support 12.

With wrench 30 still holding draw rod 20 against rotation, hob drive 15 then turns driving end support 11 at a high torque, such as 100 foot pounds, controlled by the current to the variable speed motor in hob drive 15. This also rotates hob 10 and idler end support 12, which tightens threads 21 and 22 and applies tension pulling the radial clamping faces of the end supports compressively against the end faces of hob 10. The clamping is preferably done at the largest practical diameter that does not interfere with operation of the teeth on hob 10. The larger the clamping diameter, the greater the rigidity with which hob 10 is clamped between supports 11 and 12.

Once the tensioner threads are tightened by the proper amount of torque, hob drive 15 stops, wrench 30 swings clear of draw rod 20, and the hobbing machine is ready to begin hobbing operations. When hob 10 is dull and must be removed from its working position, wrench 30 swings into engagement with draw rod 20 to hold it against rotation while hob drive 15 rotates in an opposite direction to loosen threads 21 and 22 and unclamp hob 10. The hob carrier moves into position to receive hob 10, and motor 35 reverses so that as soon as threads 21 and 22 are sufficiently loosened, motor 35 rotates idler end support 12 to spin these threads apart. Wrench 30 swings clear of draw rod 20, which cylinder 25 then moves to the broken line position clear of the working position of hob 10. Hob 10 is then taken away, and end supports 11 and 12 are left spinning so that their radial clamping faces can be cleaned by cleaning fluid 37.

A computer that controls many other operations within the hobbing machine is programmed to accomplish all the steps necessary for clamping and unclamping hob 10 with my clamping system. Sensors 27, 28, 32, 34, and other hobbing machine sensors supply information to the computer on the location of components and the completion of steps in the sequence so that hob changing and clamping can proceed reliably without any operator intervention.

Figure 3:
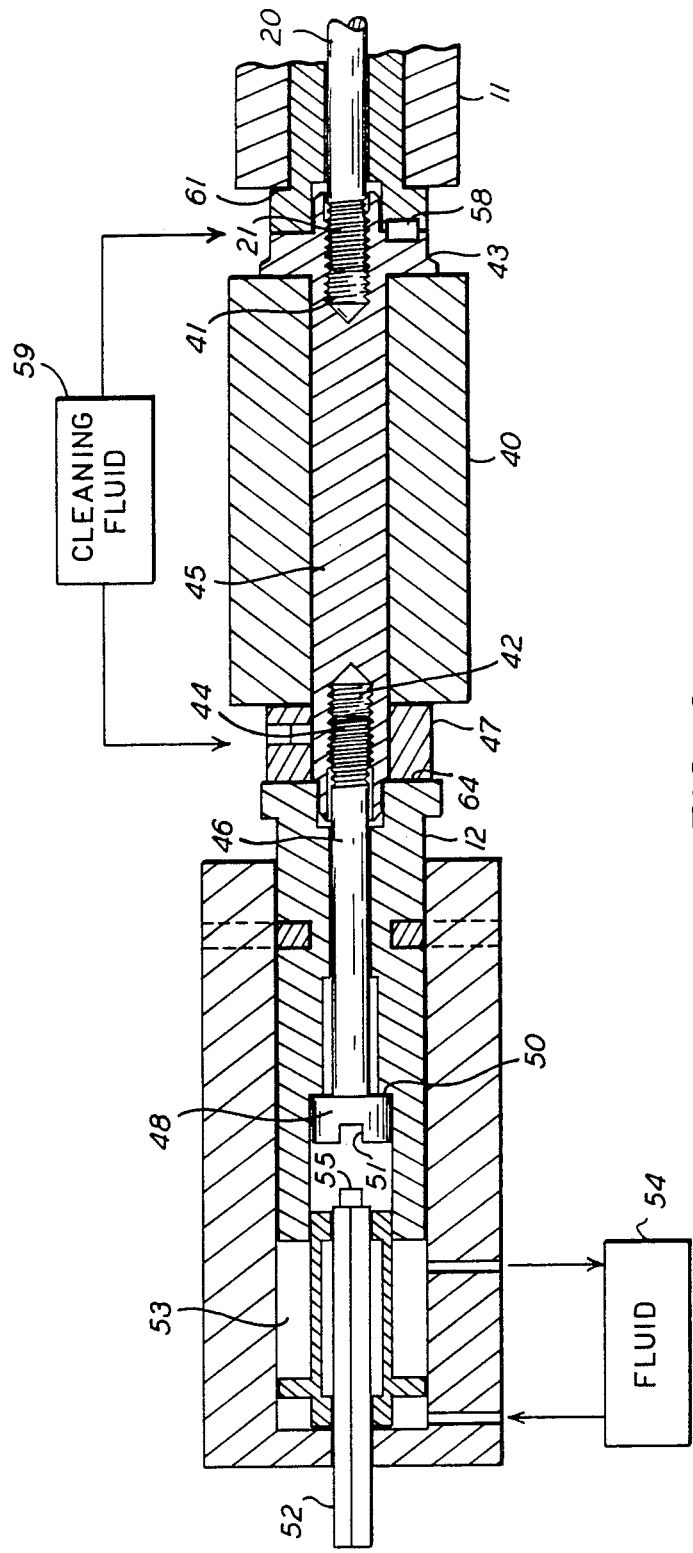
FIG. 3 is a partially schematic, fragmentary elevational view of an alternative preferred embodiment of my clamping system for an arbor mounted hob.

The embodiment of FIG. 3 works with a hob 40 mounted on a hob arbor 45, which cannot accommodate a through-extending draw rod. So arbor 45, which already extends through hob 40, is made part of a tensioner extending between the end supports; and to serve as part of a tensioner, arbor 45 is provided with threads 41 and 42 at its opposite ends. These respectively receive threads 21 of draw rod 20, mounted in driving end support 11 as previously explained, and threads 44 of another rod 46 mounted in idler end support 12. Rods 20 and 46 combine with arbor 45 to form a tensioner extending through hob 40 between end supports 11 and 12 for applying tension to pull the end supports together and compressively clamp hob 40 between them. An end flange 43 and a collar 47 of arbor 45 are interposed between hob 40 and the radial clamping faces 61 and 64 of end supports 11 and 12; and a key 58 is preferably arranged between driven end support 11 and flange 43. Collar 47 can be a grease nut compressively clamping hob 40 against flange 43.

Draw rod 20 acts as previously described, except for threading into arbor threads 41 to draw arbor flange 43 compressively against radial clamping face 61 of driven end support 11. Rod 46, at the other end of the tensioner, has a head 48 that engages a shoulder 50 in idler end support 12. Head 48 has a slot 51, analogous to a screwdriver slot, and the wrench system for the tensioner of FIG. 3 includes a non-rotatable tip 55 that can engage with slot 51 and hold rod head 48 against rotation. Tip 55 is formed on the end of a hexagonal rod 52, which cannot be rotated in idler end support 12, and which is axially movable within idler end support 12, preferably by means of cylinder 53 powered by pneumatic or hydraulic fluid 54. Cylinder 53 can advance wrench rod 52 against head 48 of rod 46 to engage its threads 44 with arbor threads 42. When these thread together, they apply clamping tension that compresses the radial clamping face 64 of end support 12 against collar 47 and hob 40.

A clamping sequence with the tensioner of FIG. 3 begins with end supports 11 and 12 separated and draw rods 20 and 46 retracted for the removal of a preceding hob. A cleaning fluid spray 59 is directed against the radial clamping face 61 of driven end support 11, while this is rotated by hob drive 15; and idler end support 12, which has no motor in the embodiment of FIG. 3, has its radial clamping face cleaned with several sprays of cleaning fluid 59 impinging at different angles.

Hob 40 and arbor 45 are moved into the working position between the end supports, which are closed by the hobbing machine against flange 43 and collar 47 so that key 58 drops into position. Then draw rod 20 is advanced and held against rotation while driving end support 11 is driven by hob drive 15 to tighten threads 21 and 41 at a predetermined torque applied by the hob drive. Wrench 30 is then disengaged, and wrench rod 52 moves against head 48 of tensioner rod 46 to press its threads 44 into engagement with arbor threads 42. Hob drive 15 again rotates driven end support 11, which rotates arbor 45 and hob 40 to screw threads 42 and 44 together, again at the predetermined torque established by the hob drive. Once both rods 20 and 46 are tightened into arbor 45, the clamping force applied by the tensioned end supports compressively clamps hob 40 in its working position. Separately screwing in rods 40 and 46 ensures that each is tightened with the predetermined clamping torque, but both rods 20 and 46 can be unscrewed simultaneously by holding them both against rotation while rotating the hob drive in the unscrewing direction.

I claim:

1. A system for clamping a hob in a working position between a pair of opposite end supports in a hobbing machine, said hob clamping system comprising:
   a. a tensioner having screw threads and being movable axially of said hob between a disengaged position clear of said hob working position and an engaged position extending through said hob between said end supports; and
   b. a wrench system for holding a portion of said tensioner against rotation while said tensioner is in said engaged position and while a hob drive of said hobbing machine rotates said end supports and said hob—in one direction for tightening said threads at a predetermined torque applied by said hob drive for compressively clamping said hob between said end supports—and in an opposite direction for unthreading said threads for unclamping said hob from between said end supports.

2. The system of claim 1 wherein said tensioner includes a hob arbor with threaded ends and a pair of rods respectively movable in each of said supports for threading into respective ends of said hob arbor.

3. The system of claim 2 wherein said wrench system includes a pair of wrenches respectively movable into engagement with said rods for holding said rods against rotation.

4. The system of claim 1 wherein said tensioner is a draw rod having a head end mounted in one of said supports and a threaded end engaging threads in another one of said supports.

5. The system of claim 4 wherein said head end of said draw rod is mounted in a driven one of said supports, and said wrench system engages and holds said head end.

6. The system of claim 5 including a motor for rotating an idler end support for threading said idler end support quickly onto said threaded end of said draw rod before rotating said hob drive for tightening said draw rod at said predetermined torque.

7. The system of claim 1 including means for rotating hob holding surfaces of both of said end supports and for directing a cleaning fluid stream against each of said holding surfaces while said hob is not between said end supports.

8. An automatic hob changer for a hobbing machine that holds a hob in a working position between a driving support and an idling support, said hob changer comprising:
   a. a tensioner having threads and being movable axially of said hob to extend between said supports; and
   b. a wrench system for holding a portion of said tensioner against rotation while rotating the hob drive of said hobbing machine to turn said hob and said supports for tightening said threads at a predetermined torque provided by said hob drive for clamping said hob compressively between said supports, and for unthreading said threads to unclamp said hob from between said supports.

9. The automatic hob changer of claim 8 wherein said tensioner includes a hob arbor with threaded ends and a pair of rods movably mounted in each of said supports for threading into each end of said hob arbor.

10. The automatic hob changer of claim 9 wherein said wrench system includes a pair of wrenches for respectively holding said rods against rotation.

11. The automatic hob changer of claim 8 wherein said tensioner includes a draw rod mounted in one of said supports with a threaded end threadable into the other one of said supports.

12. The automatic hob changer of claim 11 wherein said draw rod has a head end in a driven one of said supports and said threaded end screws into an idler one of said supports.

13. The automatic hob changer of claim 12 including a motor for rotating said idler support for quickly threading said idler support onto said draw rod before applying said predetermined tightening torque with said hob drive.

14. The automatic hob changer of claim 8 wherein said hobbing machine holds said hob between said driving support and said idling support with sufficient preclamping pressure so that rotation of said driving support turns said hob and said idling support for tightening said threads.

15. The automatic hob changer of claim 8 including means for rotating hob gripping surfaces of said supports while directing jets of cleaning fluid against said hob gripping surfaces when said hob is not between said gripping surfaces.

16. A method of clamping and unclamping a hob in a working position between a driving support and an idling support in a hobbing machine, said method comprising:
   a. closing said idling support and said driving support together so that opposed radial faces of said supports engage and hold opposite ends of said hob in said working position;
   b. axially moving a tensioner to extend through said hob between said supports;
   c. holding a portion of said tensioner against rotation while rotating said driving support with the hob drive of said hobbing machine for tightening threads of said tensioner at a torque predetermined by said hob drive to apply tension between said supports for drawing said supports into compressive clamping engagement with said hob;
   d. holding a portion of said tensioner against rotation while rotating said driving support with said hob drive for unthreading said threads for unclamping said hob; and
   e. moving said tensioner axially clear of said working position to allow removal of said hob.

17. The method of claim 16 including using a hob arbor with threaded ends as part of said tensioner, and threading a pair of rods respectively into opposite ends of said hob arbor from each of said supports.

18. The method of claim 17 including holding each of said rods against rotation while tightening threaded ends of said rods into said hob arbor.

19. The method of claim 16 including using as said tensioner a single rod having a head end in one of said supports and a threaded end threadable into another of said supports.

20. The method of claim 16 including arranging a head end of said rod in said driving support and threading said rod into said idling support.

21. The method of claim 20 including a motor on said idling support for threading said idling support onto said draw rod before turning said driving support with said hob drive for tightening said threads.

22. The method of claim 16 including closing said idling support and said driving support together with sufficient preclamping pressure so that rotating said driving support with said hob drive turns said hob and said idling support for tightening said threads.

23. The method of claim 16 including rotating the hob clamping faces of said idling support and said driving support and directing a cleaning fluid jet against said rotating clamping faces while said hob is removed from said working position.

24. An automatic hob changer for a hobbing machine having a driving support and an idling support with opposed faces between which a hob is held in a working position, said hob changer comprising:
   a. a tensioner extendable axially of said hob between said supports and having a threaded portion by which said tensioner can be tensioned between said supports for compressively clamping said hob between said supports;

b. a positioner for moving said tensioner axially between a disengaged position clear of said working position and an engaged position extending through said hob between said supports; and c. a wrench system movably mounted on said hobbing machine to hold a portion of said tensioner against rotation in said engaged position while a hob drive of said hobbing machine rotates said driving support—in one direction for screwing in said threads of said tensioner at a torque predetermined by said hob drive to clamp said hob compressively between said supports—and in another direction for unscrewing said threads for unclamping said hob.

25. The automatic hob changer of claim 24 wherein said tensioner includes a hob arbor having threaded ends and a pair of rods threadable respectively into said hob arbor ends from each of said supports.

26. The automatic hob changer of claim 25 wherein said wrench system holds each of said rods against rotation.

27. The automatic hob changer of claim 24 wherein said tensioner is a single rod mounted in one of said supports and having a threaded end threadable into an opposite one of said supports.

28. The automatic hob changer of claim 27 wherein a head end of said rod is arranged in said driving support and said threaded end of said rod threads into said idling support.

29. The automatic hob changer of claim 28 including a motor for rotating said idling support for threading said idling support onto said rod before said hob drive rotates said driving support.

30. The automatic hob changer of claim 24 wherein said driving support and said idling support holds said hob in said working position with sufficient preclamping pressure so that rotation of said driving support by said hob drive turns said hob and said idling support for screwing in said threads of said tensioner.

31. The automatic hob changer of claim 24 including means for rotating said opposed faces and directing a cleaning fluid stream against said opposed faces while said hob is out of said working position.

* * * * *